US012776522B2

(12) United States Patent
Jiang et al.

(10) Patent No.: US 12,776,522 B2
(45) Date of Patent: Oct. 27, 2026

(54) ELECTRODE SHEET, WINDING BATTERY CORE, AND BATTERY

(71) Applicant: BYD COMPANY LIMITED, Shenzhen (CN)

(72) Inventors: Xinjun Jiang, Shenzhen (CN); Jian Zhang, Shenzhen (CN); Lei Lei, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 695 days.

(21) Appl. No.: 17/977,821

(22) Filed: Oct. 31, 2022

(65) Prior Publication Data

US 2023/0048047 A1 Feb. 16, 2023

Related U.S. Application Data

(63) Continuation of application No. PCT/CN2021/086146, filed on Apr. 9, 2021.

(30) Foreign Application Priority Data

May 9, 2020 (CN) ......................... 202020758543.0

(51) Int. Cl.
*H01M 10/0587* (2010.01)
*H01M 4/13* (2010.01)

(52) U.S. Cl.
CPC ......... *H01M 10/0587* (2013.01); *H01M 4/13* (2013.01)

(58) Field of Classification Search
CPC ............... H01M 10/0587; H01M 4/13; H01M 10/0431; H01M 10/125; H01M 10/286; H01M 50/538; H01M 10/0409
See application file for complete search history.

(56) References Cited

U.S. PATENT DOCUMENTS 8,277,967 B2 10/2012 Asari et al.
10,367,194 B2 * 7/2019 Goto .................. H01M 4/0445
(Continued)

FOREIGN PATENT DOCUMENTS

CN 1742350 A 3/2006
CN 203932198 U 11/2014
(Continued)

OTHER PUBLICATIONS

Machine Translation Relied Upon for JP-2012174579-A (Year: 2012).*
(Continued)

*Primary Examiner* — Marla D Mcconnell
*Assistant Examiner* — Olivia A Jones
(74) *Attorney, Agent, or Firm* — Sheppard Mullin Richter & Hampton LLP

(57) ABSTRACT

An electrode sheet includes a current collector and a first active material layer on a first surface of the current collector. The first active material layer includes a main portion and a first buffer portion. The main portion includes a first inner surface and an outer surface. The first inner surface is attached to the current collector, and the outer surface is parallel to the first inner surface. The first active material layer has a height that is a vertical distance from the outer surface to the first inner surface. The first buffer portion includes a second inner surface, a buffer surface, and an inner wall surface defining a first groove. A first end of the buffer surface is connected to the outer surface, a second end of the buffer surface is connected to the inner wall surface. The inner wall surface is shorter than the first active material layer.

17 Claims, 10 Drawing Sheets

(56) References Cited

U.S. PATENT DOCUMENTS

| | | | | |
|---|---|---|---|---|
| 2009/0325045 | A1 | 12/2009 | Miyahisa et al. | |
| 2010/0086837 | A1 | 4/2010 | Asari et al. | |
| 2013/0143090 | A1* | 6/2013 | Hosoya ............. | H01M 10/0587 429/94 |

FOREIGN PATENT DOCUMENTS

| | | | | |
|---|---|---|---|---|
| CN | 109768223 | A | | 5/2019 |
| CN | 110729447 | A | | 1/2020 |
| CN | 211980772 | U | | 11/2020 |
| JP | 2012174579 | A | * | 9/2012 |
| JP | 2012181978 | A | | 9/2012 |
| JP | 2015210841 | A | * | 11/2015 |
| JP | 2016058375 | A | | 4/2016 |
| JP | 2018092857 | A | | 6/2018 |

OTHER PUBLICATIONS

Machine Translation Relied Upon for JP-2015210841-A (Year: 2015).*
Merriam Webster Definition of Integrate, Accessed May 21, 2025.*
Merriam Webster Definition of Integral, Accessed May 21, 2025.*
International Search Report and Written Opinion for Application No. PCT/CN2021/086146, mailed on Jul. 7, 2021, 10 pages.
Request for the Submission of an Opinion dated Nov. 4, 2024, issued in related Korean Patent Application No. 10-2022-7042977, with English machine translation (11 pages).
Notice of Final Rejection dated May 22, 2025, issued in related Korean Patent Application No. 10-2022-7042977, with English machine translation (9 pages).

* cited by examiner

ELECTRODE SHEET, WINDING BATTERY CORE, AND BATTERY

CROSS-REFERENCE TO RELATED APPLICATIONS

The application is a continuation application of International Patent Application No. PCT/CN2021/086146 filed with the China National Intellectual Property Administration (CNIPA) on Apr. 9, 2021, which is based on and claims priority to and benefits of Chinese Patent Application No. 202020758543.0 filed on May 9, 2020. The entire content of all of the above-referenced applications is incorporated herein by reference.

FIELD

The present disclosure relates to the field of batteries, and specifically to an electrode sheet, a winding battery core, and a battery.

BACKGROUND

A battery electrode sheet includes a current collector and an active material coated on a surface of the current collector. The current collector is generally an aluminum foil or a copper foil. In the current production process of the battery electrode sheet, the electrode sheet is rolled to obtain an electrode sheet that meets the design parameters.

SUMMARY

To accomplish the objectives of the present disclosure, the present disclosure provides the following technical solutions.

In a first aspect, the present disclosure provides an electrode sheet, which includes a current collector and an active material coated on a first surface of the current collector. The first active material layer includes a main portion and a first buffer portion connected to each other. The main portion includes a first inner surface and an outer surface opposite to each other. The first inner surface is attached to the current collector, and the outer surface is parallel to the first inner surface. The first active material layer has a height that is a vertical distance from the outer surface to the first inner surface, and the first thickness is defined in the range of 50 to 200 μm. The first buffer portion is provided with a first groove, configured to hold the tabs. The first buffer portion includes a second inner surface, a buffer surface and an inner wall surface defining the first groove. The second inner surface coincides with the first inner surface. A first end of the buffer surface is connected to the outer surface, and a second end of the buffer surface is connected to the inner wall surface. A height of the inner wall surface is smaller than the height of the first active material layer, and the second thickness is defined in the range of 20 to 180 μm.

In an embodiment, the buffer surface includes a curved surface, an inclined surface, a stepped surface, a curved surface, or a combination thereof.

In an embodiment, a vertical distance from a point on the buffer surface to the second inner surface is less than the height of the first active material layer.

In an embodiment, the inner wall surface of the first buffer portion includes a first wall surface, a second wall surface, and a third wall surface. The first wall surface is opposite to the second wall surface, and the third wall surface connects the first wall surface and the second wall surface. The buffer surface is disposed at a corresponding position of the first wall surface, the second wall surface, or the third wall surface.

In an embodiment, the first buffer portion and the main portion are integrated as an integral structure.

In an embodiment, the electrode sheet further includes a second active material layer provided on a second surface of the current collector opposite to the first surface of the current collector. The second active material layer includes a second buffer portion, and the second buffer portion includes a second groove. The second buffer portion and the first buffer portion have a same structure.

In an embodiment, the first buffer portion and the second buffer portion are arranged in alignment or having an offset with each other.

In an embodiment, the first groove extends upward from the first surface of the current collector, and the second groove extends downward from the second surface of the current collector.

In a second aspect, the present disclosure further provides a winding battery core, which includes a separator and two electrode sheets described in any one of the various embodiments according to the first aspect, wherein the separator is arranged between the two electrode sheets.

In a third aspect, the present disclosure provides a battery, which includes a winding battery core as described in the second aspect.

BRIEF DESCRIPTION OF THE DRAWINGS

To describe the technical solutions of the implementations of the present disclosure or the existing technology more clearly, the following briefly introduces the accompanying drawings required for describing the implementations or the existing technology. Apparently, the accompanying drawings in the following description show only some implementations of the present disclosure, and a person of ordinary skill in the art may derive other drawings from these accompanying drawings without creative efforts.

Figure 1:
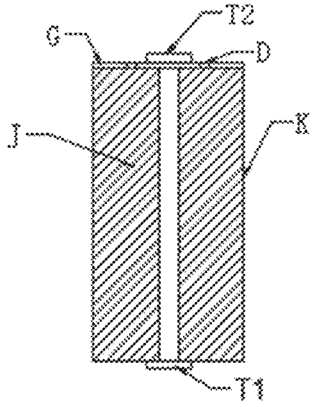
FIG. 1 is a schematic structural view of a battery according to an embodiment.

LIST OF REFERENCE NUMERALS battery 100, battery housing K, winding battery core J, battery upper cover G, boss T1, cylindrical boss T2, electrolyte injection port D, separator 3, electrode sheet 1 or 2, current collector 10, first active material layer 11, main portion U, first inner surface N1, outer surface W, first buffer portion V1, first thickness H1, first groove C1, second inner surface N2, buffer surface S, inner wall surface B, second thickness H2, roller Y, first wall surface B1, second wall surface B2, third wall surface B3, second active material layer 12, second buffer portion V2, second groove C2, first side 5, second side 6.

DETAILED DESCRIPTION

The following clearly and completely describes the technical solutions in the implementations of the present disclosure with reference to the accompanying drawings in the implementations of the present disclosure. Apparently, the described embodiments are merely some but not all of the implementations of the present disclosure. All other implementations obtained by a person of ordinary skill in the art based on the implementations of the present disclosure without creative efforts shall fall within the protection scope of the present disclosure.

During the rolling process to make a battery electrode sheet, the active material is pressed, and the active material will squeeze the foil, eventually leading to the extension of the foil. Since no foil extension occurs at the position where no active material layer is coated, ripples and even wrinkles in severe cases are formed in appearance at the edge of the foil due to different extensions at positions with or without the active material. Wrinkling of a groove in the electrode sheet will affect the welding strength of the tabs, causing poor welding or increasing the resistance of the battery, fast heat generation during the charge and discharge process of the battery, and accelerated attenuation of the cycle life. At positions where the groove meets the active material, the active material tends to fall off, exposing the foil from the electrode sheet. At positions where the foil is exposed on the negative electrode sheet, lithium precipitation is more likely to occur, due to low polarization.

The present disclosure provides an electrode sheet, a winding battery core and a battery, to solve the problems of exposing the foil of the battery electrode sheet, short cycle life of the battery core and fast heat generation of the battery caused by the wrinkling of the current collector during the rolling process of the electrode sheet.

The disclosed techniques provide a buffer surface of the first buffer portion, so that the pressure on the first buffer portion is reduced in the rolling process, whereby the pressure transferred by the first buffer portion to the current collector is lowered, and the extension of the current collector decreases, thereby reducing or even eliminating the wrinkling of the current collector. The reduction of the wrinkling of the current collector reduces the risk of exposing the foil caused by peeling off of the active material, thus improving the cycle life of the battery core, and slowing down the heat generation of the battery.

Figure 24:
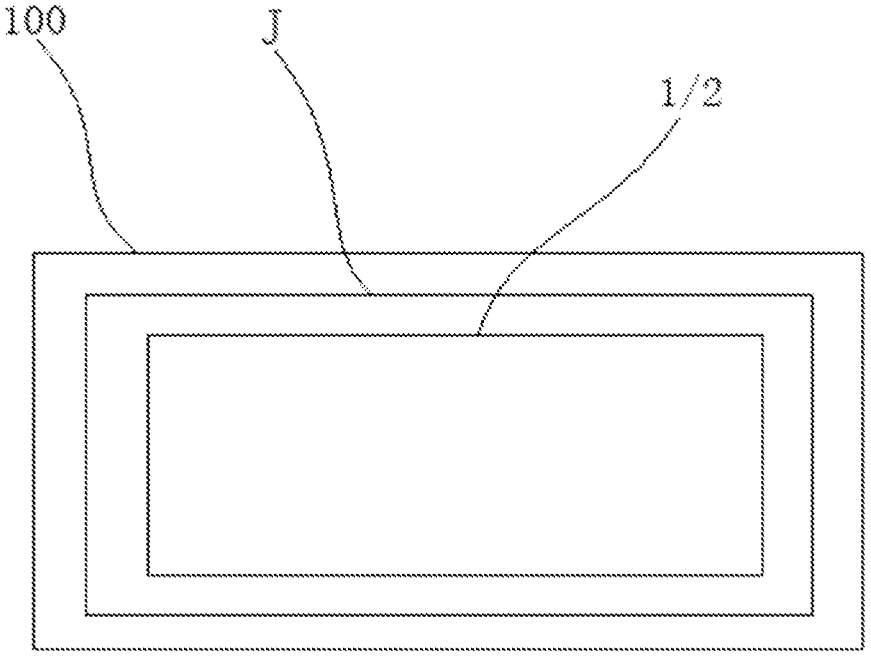
FIG. 24 is a schematic structural view of a battery according to an embodiment.

Referring to FIGS. 1 and 24, an embodiment of the present disclosure provides a battery 100. The battery 100 includes a battery housing K, a winding battery core J accommodated in the battery housing K, and a battery upper cover G. The structure of the winding battery core J provided in the embodiment of the present disclosure will be described later. The battery housing K can be a cylinder with an open upper end, and the inner wall at the bottom of the cylinder is electrically connected to a negative electrode current collection sheet of the winding battery core J. A boss T1 is provided at a central position of an outer bottom of the battery casing K, to connect a negative electrode of the battery to an external device. The battery upper cover G is a disc-shaped cover that matches the battery housing K, and has a bottom provided with a downwardly protruding plane that is electrically connected to a positive electrode current collection sheet. An insulating sealing ring is mounted between the positive electrode current collection sheet and the battery housing K. A cylindrical boss T2 protruding upward is provided at a central position on a top of the battery upper cover, to connect a positive electrode of the battery to an external device. The battery upper cover G is provided with an electrolyte injection port D. The transmission of electrons between the positive and negative electrodes is achieved by injecting an electrolyte. After the electrolyte is injected, the electrolyte injection port is sealed with a sealing pin. The battery 100 with such a structure has less heat generation during the charge and discharge process, and low attenuation rate during cycles, allowing the battery 100 to have a long service life. By using the winding battery core J provided in the present disclosure, the wrinkling of the electrode sheet is reduced or even eliminated. This reduces the resistance of the battery 100, enables low heat generation of the battery 100, reduces the occurrence of exposed current collector caused by the falling off of the active material layer from the electrode sheet, and extends the service life of the battery 100.

Figure 2:
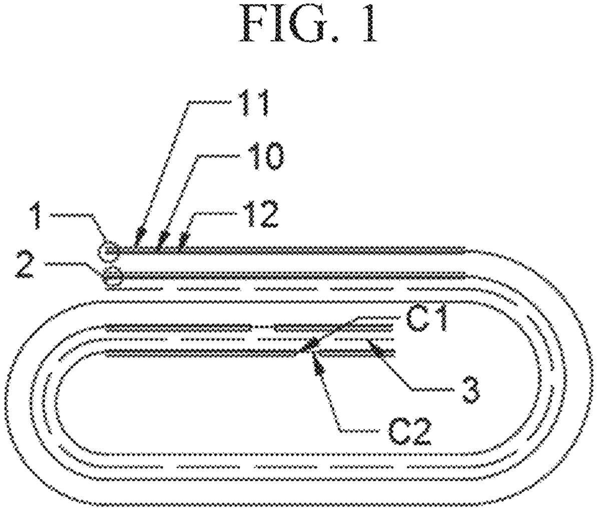
FIG. 2 is a schematic structural view of a winding battery core according to an embodiment.

Referring to FIG. 2, an embodiment of the present disclosure provides a winding battery core J. The winding battery core J includes a separator 3 and an electrode sheet 1 and an electrode sheet 2 provided in an embodiment of the present disclosure. The electrode sheet 1 and the electrode sheet 2 can be a positive electrode sheet and a negative electrode sheet. The separator 3 is usually a polymer material with nano-scale pores, and is provided between the electrode sheet 1 and the electrode sheet 2 to separate the two electrode sheets from each other, so as to avoid the short circuit caused by the contact between the positive and negative electrodes, and to permit the electrolyte ions to pass through. The electrode sheet 1, the separator 3, and the electrode sheet 2 are stacked, and then are wound by a special winding machine into the winding battery core J. By using the electrode sheet provided in the present disclosure, the wrinkling of the electrode sheet is reduced or even eliminated. As a result, the falling off of the active material layer from the electrode sheet is reduced, and the attenuation rate of the battery core during cycles is lowered, Referring to FIG. 3, an embodiment of the present disclosure provides an electrode sheet, which includes a current collector 10 and a first active material layer 11 coated on a surface of the current collector 10, such as a first surface of the current collector 10. The current collector 10 is usually an aluminum foil or a copper foil, and the first active material layer 11 mainly includes an active material, a conductive agent, a binder, and other ingredients. The first active material layer 11 includes a main portion U and a first buffer portion V1 connected to each other. The main portion U includes a first inner surface N1 and an outer surface W opposite to each other. The first inner surface N1 is attached to the current collector 10, and the outer surface W is parallel to the first inner surface N1, where a vertical distance from the outer surface W to the first inner surface N1 is the height of the first active material layer or the first thickness H1, and the first thickness H1 is defined in the range of 50 to 200 μm.

Figure 3:
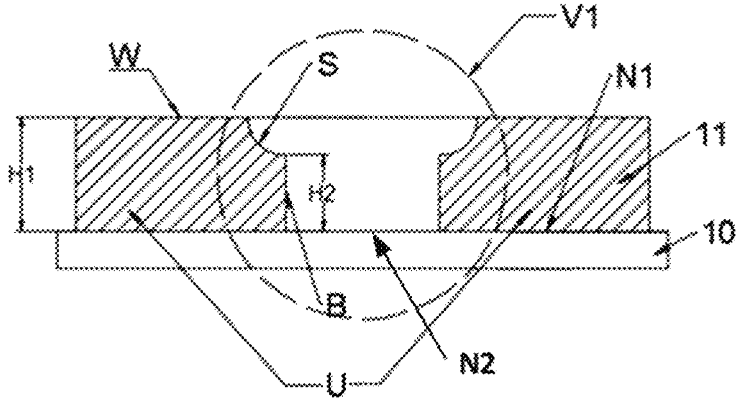
FIG. 3 is a schematic structural view of the front of an electrode sheet according to an embodiment.
Figure 4:
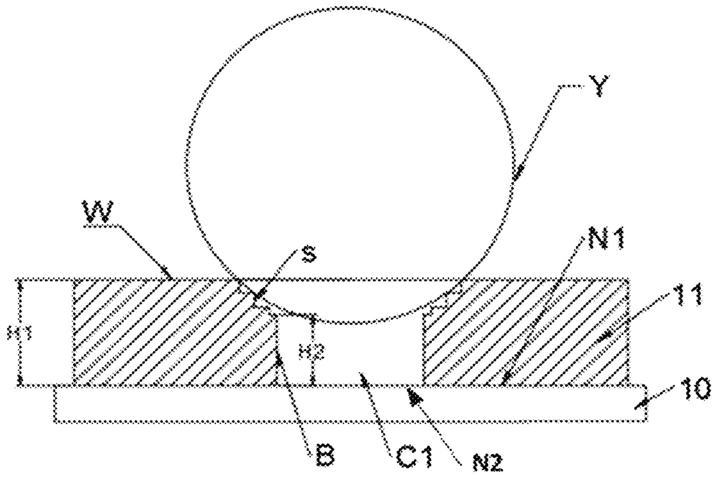
FIG. 4 is a schematic structural view of the front of an electrode sheet according to an embodiment.

Referring to FIGS. 3 and 4, the first buffer portion V1 is provided with a first groove C1. The first buffer portion V1 includes a second inner surface N2, a buffer surface S, and an inner wall surface B defining the first groove C1. The second inner surface N2 coincides with the first inner surface N1. One end of the buffer surface S is connected to the outer surface W, and another end of the buffer surface S is connected to the inner wall surface B. A vertical distance from the intersection line where the buffer surface S and the inner wall surface B are connected to the second inner surface N2 is the height of the inner wall surface or the second thickness H2. The second thickness H2 is smaller than the first thickness H1. The second thickness is defined in the range of 20 to 180 μm.

By setting the buffer surface S, when the electrode sheet passes through a roller Y, the pressure on the first buffer portion V1 is reduced in the rolling process, whereby the pressure transferred by the first buffer portion V1 to the current collector 10 is lowered, and the extension of the current collector 10 decreases, thereby reducing or even eliminating the wrinkling of the current collector 10. The reduction of the wrinkling of the current collector 10 reduces the risk of foil exposure caused by peeling off of the active material, thus improving the cycle life of the battery, and slowing down the heat generation of the battery 100.

In an embodiment, referring to FIG. 3, the first buffer portion V1 and the main portion U are integrated as an integral structure by an integral molding process. The process is simple, and the structure is easy to fabricate. In other embodiments, the first buffer portion V1 and main portion U may also be fabricated separately and then connected together.

In an embodiment, referring to FIGS. 3 and 4, the buffer surface S between the outer surface W and the inner wall surface B is a curved surface. During the rolling process, the roller Y transitions from the outer surface W through the buffer surface S to the inner wall surface B of the current collector 10. The pressure decreases when it reaches the periphery of the first groove C1, so the pressure applied on the current collector 10 is reduced, the extension decreases accordingly, and the wrinkling is alleviated.

Figure 5:
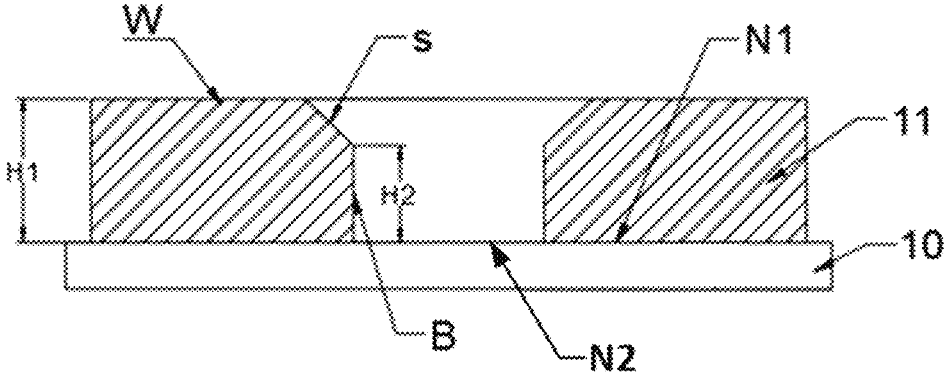
FIG. 5 is a schematic structural view of the front of an electrode sheet according to an embodiment.

In another embodiment, referring to FIG. 5, the buffer surface S between the outer surface W and the inner wall surface B is an inclined surface. By arranging the buffer surface S to be an inclined surface, the contact area between the roller Y and the first buffer portion V1 is changed uniformly and the pressure applied on the current collector 10 also varies uniformly during the rolling process, thus further reducing the tendency of wrinkling of the current collector 10.

Figure 6:
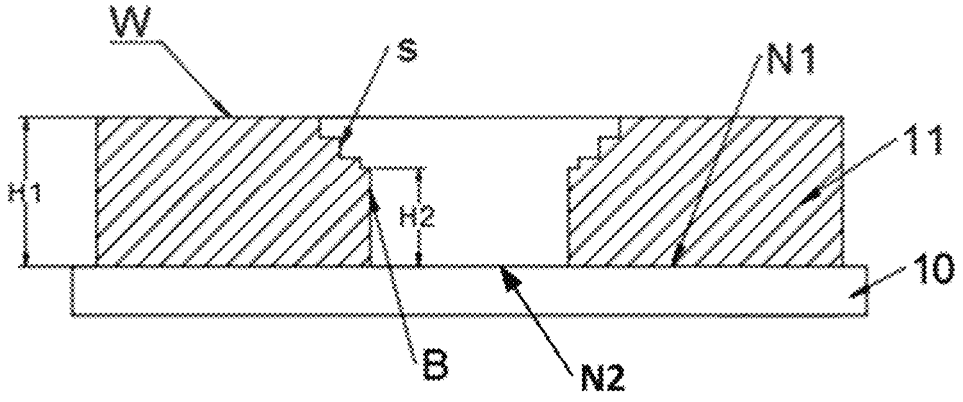
FIG. 6 is a schematic structural view of the front of an electrode sheet according to an embodiment.

In another embodiment, referring to FIGS. 4 and 6, the buffer surface S between the outer surface W and the inner wall surface B is a stepped surface. By means of the buffering effect of the buffer surface S, the pressure applied on the current collector 10 decreases when the roller Y passes through the first buffer portion V1, and the extension of the current collector 10 decreases accordingly, to reduce the occurrence of wrinkling.

Figure 7:
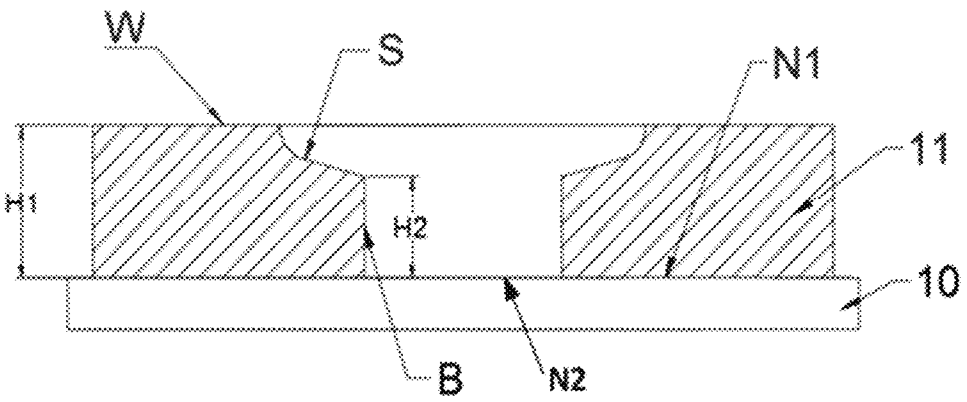
FIG. 7 is a schematic structural view of the front of an electrode sheet according to an embodiment.

In another embodiment, referring to FIG. 7, the buffer surface S between the outer surface W and the inner wall surface B is a combination of a curved surface and an inclined surface.

Figure 8:
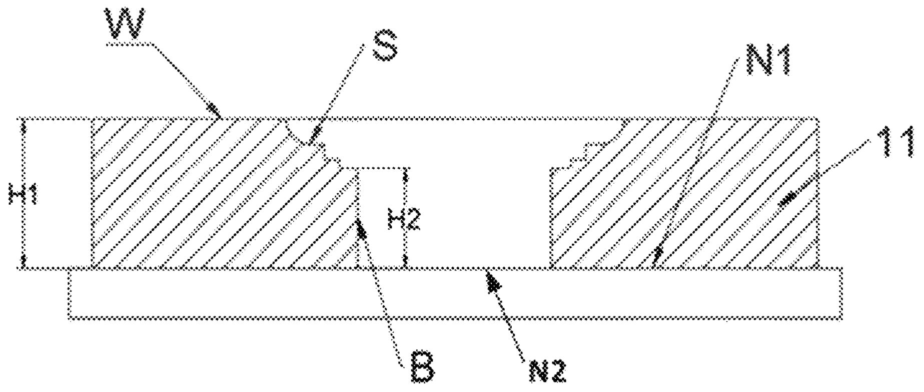
FIG. 8 is a schematic structural view of the front of an electrode sheet according to an embodiment.

In another embodiment, referring to FIG. 8, the buffer surface S between the outer surface W and the inner wall surface B is a combination of a curved surface and a stepped surface.

Figure 9:
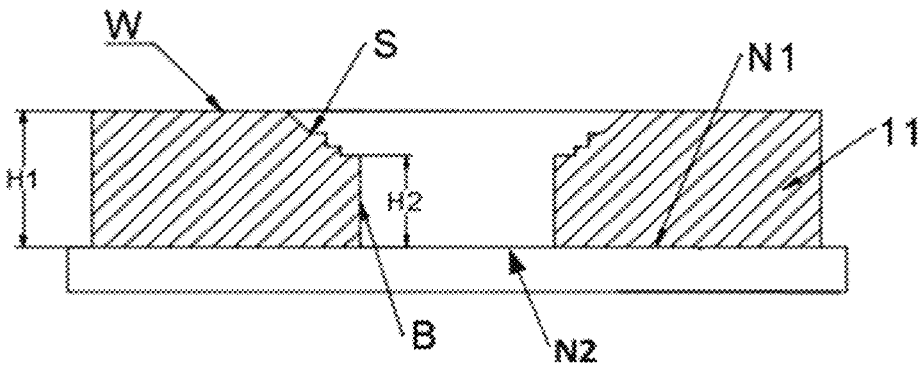
FIG. 9 is a schematic structural view of the front of an electrode sheet according to an embodiment.

In another embodiment, referring to FIG. 9, the buffer surface S between the outer surface W and the inner wall surface B is a combination of an inclined surface and a stepped surface.

Figure 10:
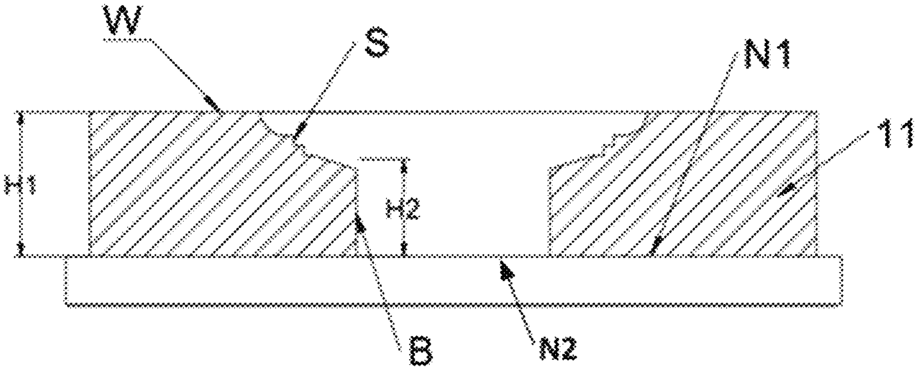
FIG. 10 is a schematic structural view of the front of an electrode sheet according to an embodiment.

In another embodiment, referring to FIG. 10, the buffer surface S between the outer surface W and the inner wall surface B is a combination of a curved surface, an inclined surface, and a stepped surface. By arranging the buffer surface S to be a combination of different types of surfaces, a better buffering effect is achieved, thus achieving a better effect of reducing the wrinkling of the current collector 10.

In an embodiment, referring to FIG. 3, a vertical distance from any point on the buffer surface S to the second inner surface N2 is less than the first thickness H1. By defining the height from the buffer surface S to the current collector 10 to be shorter than the height from the outer surface W to the current collector 10, the pressure applied on each portion of the current collector 10 facing the buffer surface S is ensured to be lower, so the surface of the current collector 10 is less wrinkled after rolling.

The inner wall surface B of the first buffer portion V1 includes a first wall surface B1, a second wall surface B2, and a third wall surface B3. The first wall surface B1 is opposite to the second wall surface B2, and the third wall surface B3 connects the first wall surface B1 and the second wall surface B2. The buffer surface S is provided at a corresponding position of at least one of the first wall surface B1, the second wall surface B2, or the third wall surface B3.

Figure 11:
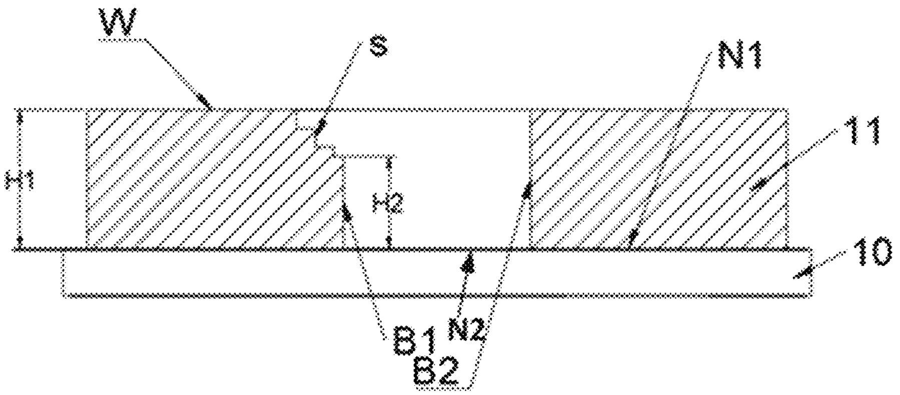
FIG. 11 is a schematic structural view of the front of an electrode sheet according to an embodiment.
Figure 12:
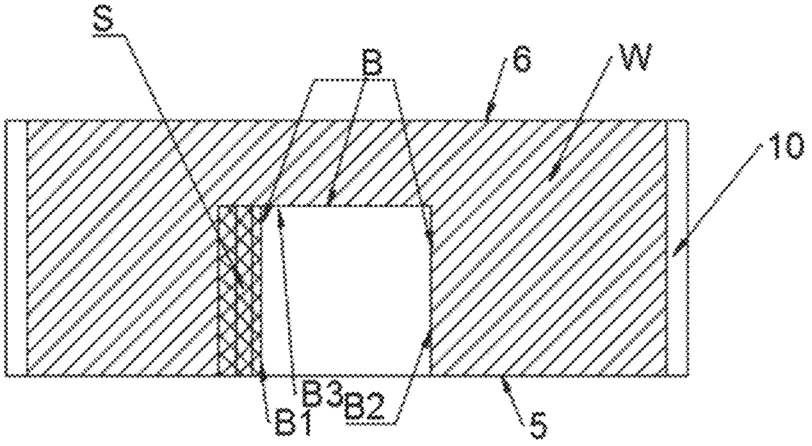
FIG. 12 is a schematic structural view of the top of an electrode sheet according to an embodiment.

In an embodiment, referring to FIGS. 11 and 12, the buffer surface S is disposed on the first wall surface B1, but not on the second wall surface B2 and the third wall surface B3. In this embodiment, the buffer surface S is a stepped surface. In other embodiments, the buffer surface S may be other types of surfaces as described above.

Figure 13:
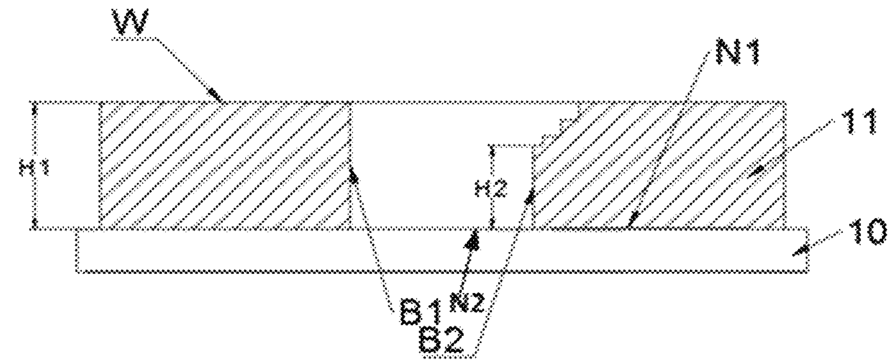
FIG. 13 is a schematic structural view of the front of an electrode sheet according to an embodiment.
Figure 14:
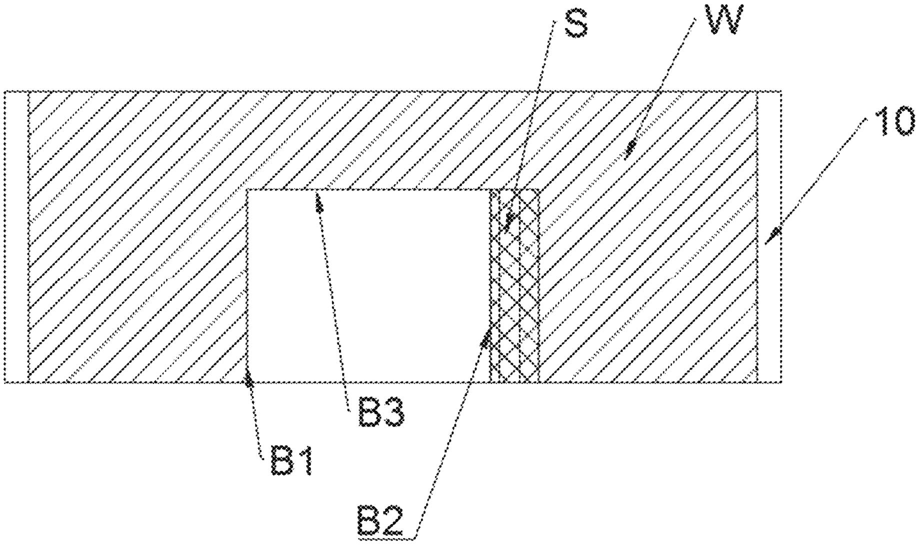
FIG. 14 is a schematic structural view of the top of an electrode sheet according to an embodiment.

In another embodiment, referring to FIGS. 13 and 14, the buffer surface S is disposed on the second wall surface B2, but not on the first wall surface B1 and the third wall surface B3. In this embodiment, the buffer surface S is a stepped surface. In other embodiments, the buffer surface S may be other types of surfaces as described above.

Figure 15:
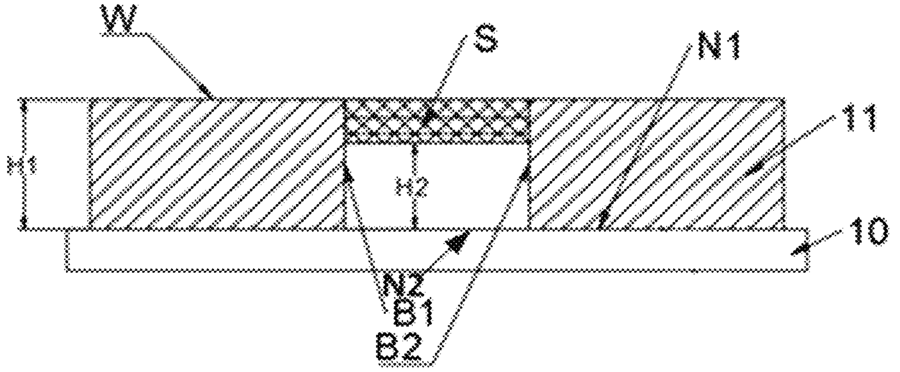
FIG. 15 is a schematic structural view of the top of an electrode sheet according to an embodiment.
Figure 16:
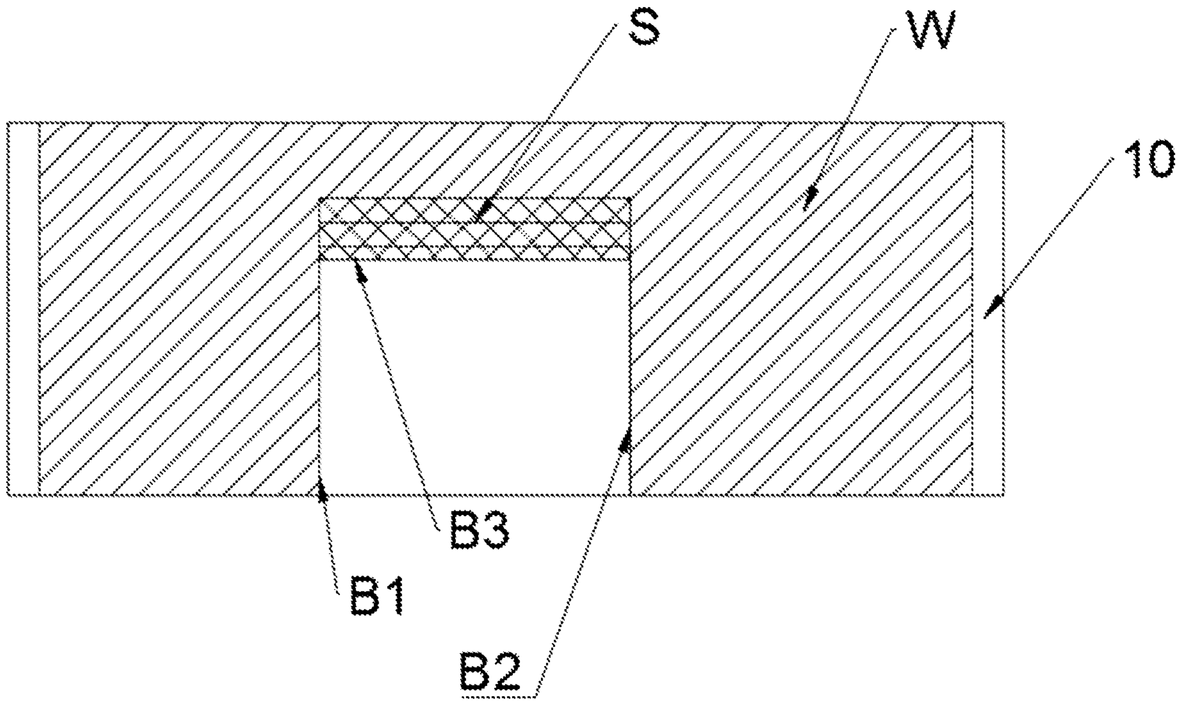
FIG. 16 is a schematic structural view of the top of an electrode sheet according to an embodiment.

In another embodiment, referring to FIGS. 15 and 16, the buffer surface S is disposed on the third wall surface B3, but not on the first wall surface B1 and the second wall surface B2. In this embodiment, the buffer surface S is a stepped surface. In other embodiments, the buffer surface S may be other types of surfaces as described above.

Figure 17:
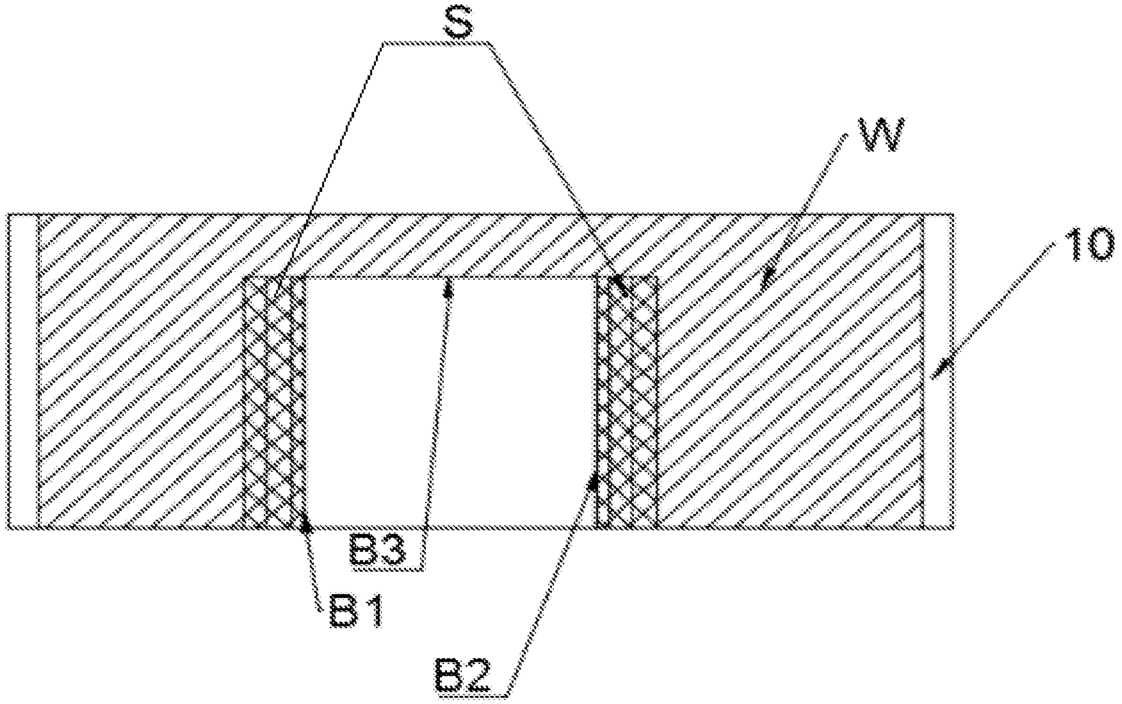
FIG. 17 is a schematic structural view of the top of an electrode sheet according to an embodiment.

In another embodiment, referring to FIG. 17, the buffer surface S is disposed on the first wall surface B1 and the second wall surface B2, but not on the third wall surface B3. In this embodiment, the buffer surface S is a stepped surface. In other embodiments, the buffer surface S may be other types of surfaces as described above.

Figure 18:
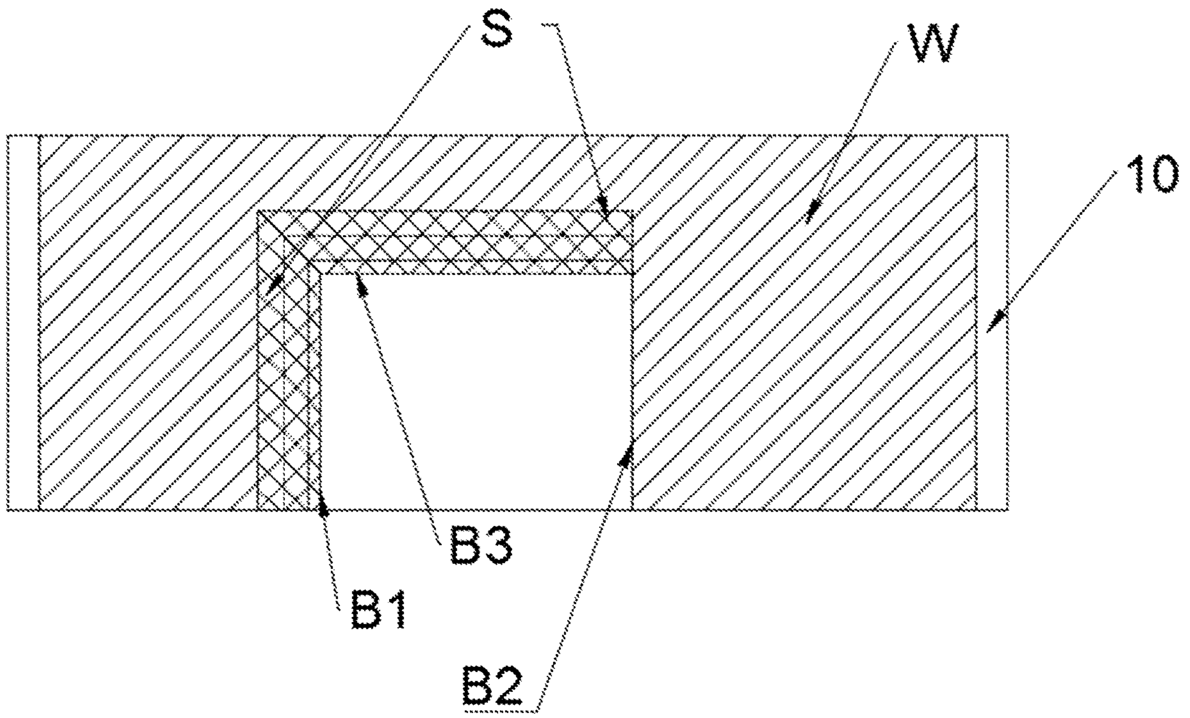
FIG. 18 is a schematic structural view of the top of an electrode sheet according to an embodiment.

In another embodiment, referring to FIG. 18, the buffer surface S is disposed on the first wall surface B1 and the third wall surface B3, but not on the second wall surface B2. In this embodiment, the buffer surface S is a stepped surface. In other embodiments, the buffer surface S may be other types of surfaces as described above.

Figure 19:
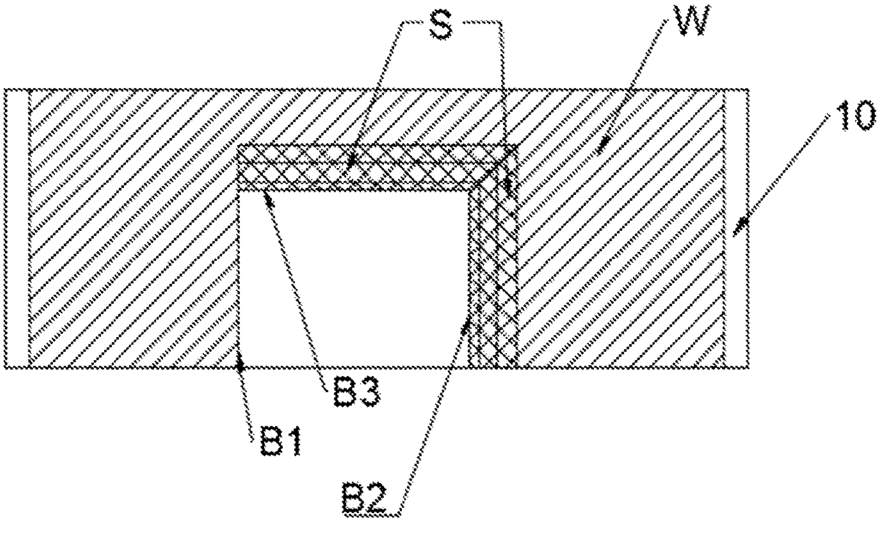
FIG. 19 is a schematic structural view of the top of an electrode sheet according to an embodiment.

In another embodiment, referring to FIG. 19, the buffer surface S is disposed on the second wall surface B2 and the third wall surface B3, but not on the first wall surface B1. In this embodiment, the buffer surface S is a stepped surface. In other embodiments, the buffer surface S may be other types of surfaces as described above.

Figure 20:
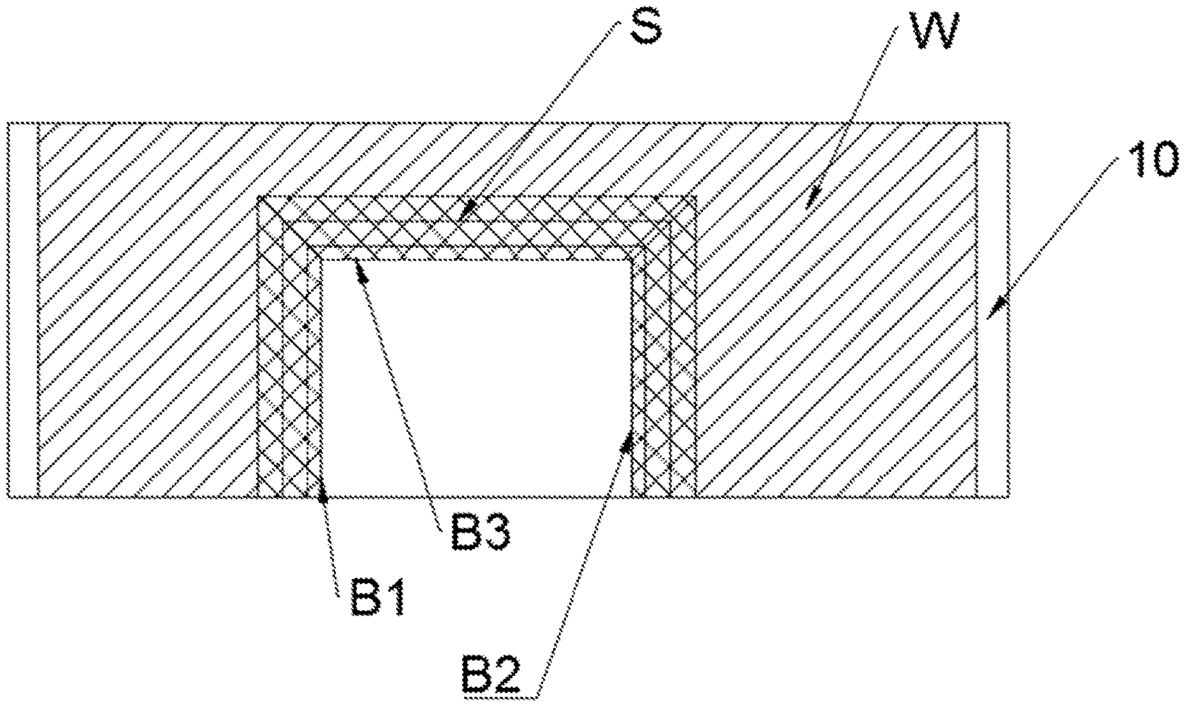
FIG. 20 is a schematic structural view of the top of an electrode sheet according to an embodiment.

In another embodiment, referring to FIG. 20, the buffer surface S is disposed on the first wall surface B1, the second wall surface B2, and the third wall surface B3. In this embodiment, the buffer surface S is a stepped surface. In other embodiments, the buffer surface S may be other types of surfaces as described above. An optimum solution can be obtained by arranging the buffer surface S on different inner wall surfaces, to minimize the wrinkling of the current collector 10.

Figure 21:
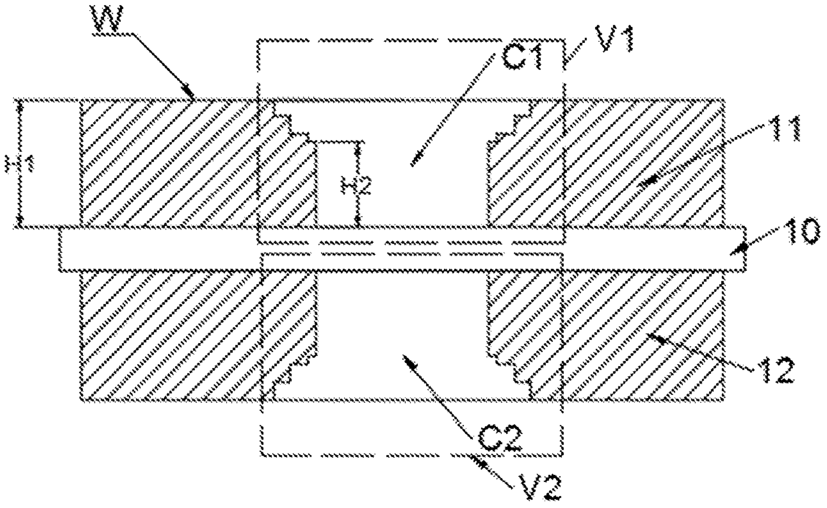
FIG. 21 is a schematic structural view of the front of an electrode sheet according to an embodiment.

Referring to FIG. 21, the electrode sheet further includes a second active material layer 12. The second active material layer 12 is provided on another side of the current collector 10 facing away from the first active material layer 11, such as a second surface of the current collector 10. The second active material layer 12 is provided with a second buffer portion V2, and the second buffer portion V2 is provided with a second groove C2. The structure of the second buffer portion V2 may be the same as the structure of the first buffer portion V1, such the structures have a same shape and a same size.

In an embodiment, referring to FIG. 21, the first buffer portion V1 and the second buffer portion V2 are arranged in alignment with each other.

Figure 22:
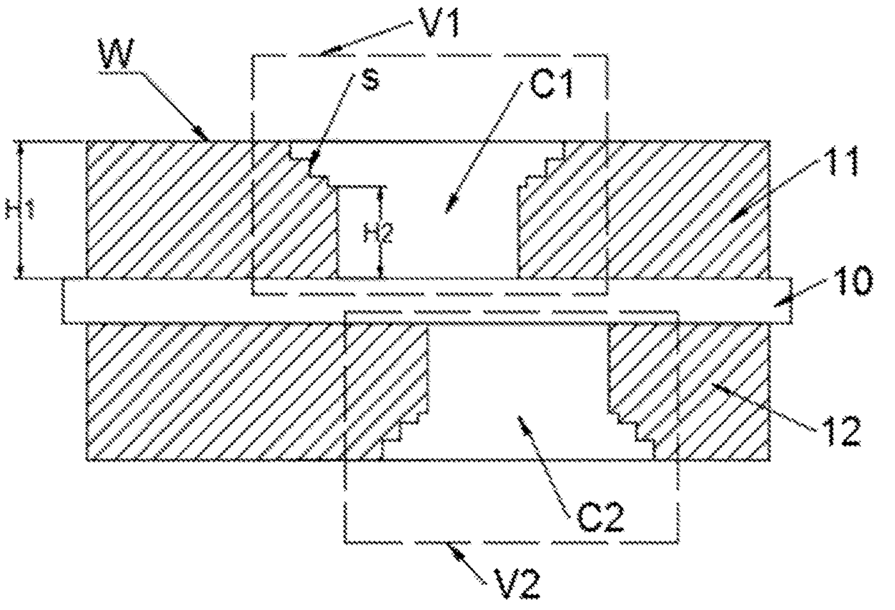
FIG. 22 is a schematic structural view of the front of an electrode sheet according to an embodiment.

In another embodiment, referring to FIG. 22, the first buffer portion V1 and the second buffer portion V2 are arranged to offset with each other.

Figure 23:
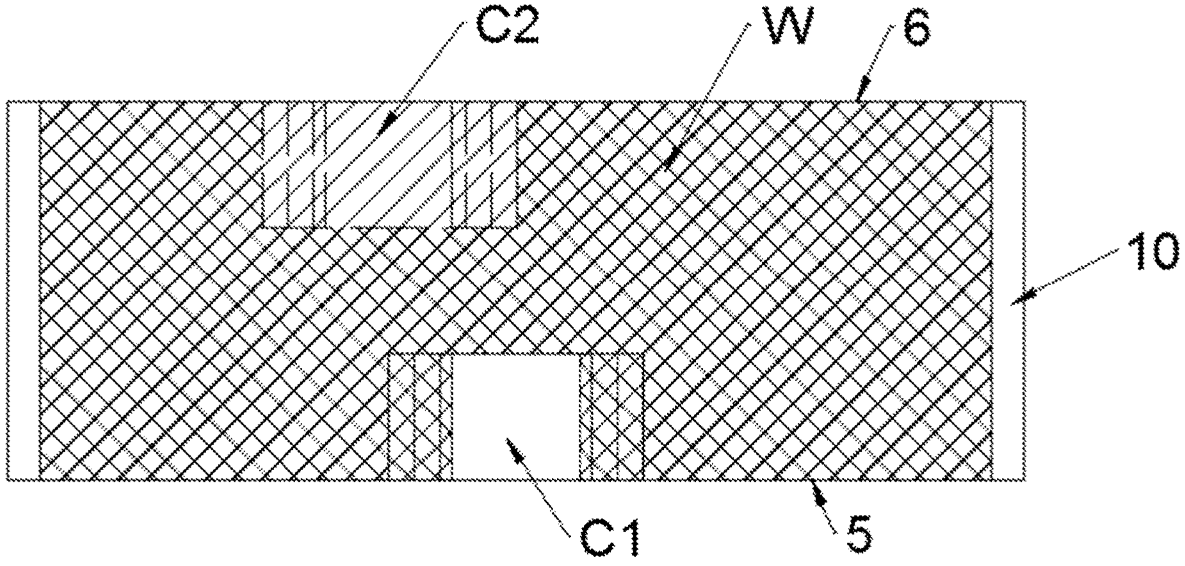
FIG. 23 is a schematic structural view of the top of an electrode sheet according to an embodiment.

Referring to FIGS. 12 and 23, the current collector 10 includes a first side 5 and a second side 6 opposing to each other.

In an embodiment, referring to FIG. 12, the first groove C1 extends from the first side 5 towards the second side 6, and the second groove C2 also extends from the first side 5 towards the second side 6.

In another embodiment, referring to FIG. 23, the first groove C1 extends from the first side 5 towards the second side 6, and the second groove C2 extends from the second side 6 towards the first side 5.

Although some embodiments are disclosed, and they do not limit the protection scope of the present disclosure. A person of ordinary skill in the art understands that any complete or partial implementation of the foregoing embodiments and any equivalent variations made based on the claims of the present disclosure shall fall within the scope covered by the present disclosure.

What is claimed is:

1. An electrode sheet, comprising a current collector and a first active material layer coated on a first surface of the current collector, wherein the first active material layer comprises a main portion and a first buffer portion connected to each other, the main portion comprises a first inner surface and an outer surface opposite to each other, the first inner surface is attached to the current collector, the outer surface is parallel to the first inner surface, and the first active material layer has a height that is a vertical distance from the outer surface to the first inner surface, and the first buffer portion comprises a second inner surface, a buffer surface, and an inner wall surface defining a first groove of the first buffer portion, the second inner surface is connected to the first inner surface, the second inner surface is attached to the current collector, the outer surface is parallel to the second inner surface, a first end of the buffer surface is connected to the outer surface, a second end of the buffer surface is connected to the inner wall surface, a height of the inner wall surface is smaller than the height of the first active material layer, wherein a size of an opening formed at the first end of the buffer surface is larger than a size of an opening formed at the second end of the buffer surface, wherein the buffer surface comprises a combination of at least two of a curved surface, a stepped surface, and an inclined surface.

2. The electrode sheet according to claim 1, wherein a vertical distance from a point on the buffer surface to the second inner surface is less than the height of the first active material layer.

3. The electrode sheet according to claim 1, wherein the inner wall surface of the first buffer portion comprises a first wall surface, a second wall surface, and a third wall surface, the first wall surface is opposite to the second wall surface, the third wall surface connects the first wall surface and the second wall surface, and the buffer surface is connected to at least one of the first wall surface, the second wall surface, and the third wall surface.

4. The electrode sheet according to claim 1, wherein the first buffer portion and the main portion are integrated as an integral structure.

5. The electrode sheet according to claim 1, further comprising a second active material layer provided on a second surface of the current collector opposite to the first surface of the current collector, wherein the second active material layer comprises a second buffer portion, and the second buffer portion comprises a second groove.

6. The electrode sheet according to claim 5, wherein the first buffer portion and the second buffer portion are arranged in alignment or having an offset with each other.

7. The electrode sheet according to claim 5, wherein the first groove extends upward from the first surface of the current collector, and the second groove extends downward from the second surface of the current collector.

8. The electrode sheet according to claim 5, wherein the second buffer portion and the first buffer portion have a same structure.

9. A winding battery core, comprising a separator and two electrode sheets, wherein the separator is arranged between the two electrode sheets, and wherein each of the two electrode sheets comprises a current collector and a first active material layer coated on a first surface of the current collector, the first active material layer comprises a main portion and a first buffer portion connected to each other, the main portion comprises a first inner surface and an outer surface opposite to each other, the first inner surface is attached to the current collector, the outer surface is parallel to the first inner surface, and the first active material layer has a height that is a vertical distance from the outer surface to the first inner surface, and the first buffer portion comprises a second inner surface, a buffer surface, and an inner wall surface defining a first groove of the first buffer portion, the second inner surface is connected to the first inner surface, the second inner surface is attached to the current collector, the outer surface is parallel to the second inner surface, a first end of the buffer surface is connected to the outer surface, a second end of the buffer surface is connected to the inner wall surface, a height of the inner wall surface is smaller than the height of the first active material layer, wherein a size of an opening formed at the first end of the buffer surface is larger than a size of an opening formed at the second end of the buffer surface, wherein the buffer surface comprises a combination of at least two of a curved surface, a stepped surface, and an inclined surface.

10. The winding battery core according to claim 9, wherein a vertical distance from a point on the buffer surface to the second inner surface is less than the height of the first active material layer.

11. The winding battery core according to claim 9, wherein the inner wall surface of the first buffer portion comprises a first wall surface, a second wall surface, and a third wall surface, the first wall surface is opposite to the second wall surface, the third wall surface connects the first wall surface and the second wall surface, and the buffer surface is connected to at least one of the first wall surface, the second wall surface, and the third wall surface.

12. The winding battery core according to claim 9, wherein each of the two electrode sheets comprises a second active material layer provided on a second surface of the current collector opposite to the first surface of the current collector, the second active material layer comprises a second buffer portion, and the second buffer portion comprises a second groove.

13. The winding battery core according to claim 12, wherein the first groove extends upward from the first surface of the current collector, and the second groove extends downward from the second surface of the current collector.

14. A battery, comprising a winding battery core comprising a separator and two electrode sheets, wherein the separator is arranged between the two electrode sheets, and wherein each of the two electrode sheets comprises a current collector and a first active material layer coated on a first surface of the current collector, the first active material layer comprises a main portion and a first buffer portion connected to each other, the main portion comprises a first inner surface and an outer surface opposite to each other, the first inner surface is attached to the current collector, the outer surface is parallel to the first inner surface, and the first active material layer has a height that is a vertical distance from the outer surface to the first inner surface, and the first buffer portion comprises a second inner surface, a buffer surface, and an inner wall surface defining a first groove of the first buffer portion, the second inner surface is connected to the first inner surface, the second inner surface is attached to the current collector, the outer surface is parallel to the second inner surface, a first end of the buffer surface is connected to the outer surface, a second end of the buffer surface is connected to the inner wall surface, a height of the inner wall surface is smaller than the height of the first active material layer, wherein a size of an opening formed at the first end of the buffer surface is larger than a size of an opening formed at the second end of the buffer surface, wherein the buffer surface comprises a combination of at least two of a curved surface, a stepped surface, and an inclined surface.

15. The battery according to claim 14, wherein the inner wall surface of the first buffer portion comprises a first wall surface, a second wall surface, and a third wall surface, the first wall surface is opposite to the second wall surface, the third wall surface connects the first wall surface and the second wall surface, and the buffer surface is connected to at least one of the first wall surface, the second wall surface, and the third wall surface.

16. The battery according to claim 14, wherein each of the two electrode sheets comprises a second active material layer provided on a second surface of the current collector opposite to the first surface of the current collector, the second active material layer comprises a second buffer portion, and the second buffer portion comprises a second groove.

17. The battery according to claim 16, wherein the first groove extends upward from the first surface of the current collector, and the second groove extends downward from the second surface of the current collector.

* * * * *